(12) United States Patent
Schwabe et al.

(10) Patent No.: US 11,811,316 B2
(45) Date of Patent: Nov. 7, 2023

(54) ADAPTIVE CONTROL OF A SWITCHED VOLTAGE CONVERTER

(71) Applicant: INFINEON TECHNOLOGIES AUSTRIA AG, Villach (AT)

(72) Inventors: Benjamin L. Schwabe, Munich (DE); Christian Rainer, Klagenfurt (AT); Darryl Galipeau, Warwick, RI (US)

(73) Assignee: Infineon Technologies Austria AG, Villach (AT)

( * ) Notice: Subject to any disclaimer, the term of this patent is extended or adjusted under 35 U.S.C. 154(b) by 547 days.

(21) Appl. No.: 16/228,444

(22) Filed: Dec. 20, 2018

(65) Prior Publication Data
US 2020/0204070 A1    Jun. 25, 2020

(51) Int. Cl.
*H02M 3/156* (2006.01)
*H02M 3/06* (2006.01)
(Continued)

(52) U.S. Cl.
CPC .............. *H02M 3/156* (2013.01); *H02M 3/06* (2013.01); *H02M 3/07* (2013.01); *H02M 3/158* (2013.01)

(58) Field of Classification Search
CPC .......... H02M 3/156; H02M 3/06; H02M 3/07; H02M 1/15; H02M 2001/0058; H02M 2001/0077; H02M 3/158; H02M 3/02; H02M 3/04; H02M 3/071; H02M 3/072; H02M 3/073; H02M 3/075; H02M 3/076; H02M 3/077; H02M 3/10; H02M 3/135;
(Continued)

(56) References Cited

U.S. PATENT DOCUMENTS

| | | | | |
|---|---|---|---|---|
| 4,965,532 A | * | 10/1990 | Sakurai | .................. G01N 29/36 310/316.01 |
| 7,903,058 B1 | * | 3/2011 | Jacquet | .................. H05B 45/46 345/82 |

(Continued)

OTHER PUBLICATIONS

Yoon-Myoung Gimm et al, "Frequency Tracking of Resonance Frequency Variation of L-C Circuits for Wireless Energy Transmission to Medical Devices in Human Organs", Journal of Electromagnetic Engineering and Science, Dec. 31, 2011, pp. 298-303, XP055 693358.

(Continued)

*Primary Examiner* — Thienvu V Tran
*Assistant Examiner* — Carlos O Rivera-Perez
(74) *Attorney, Agent, or Firm* — Armis IP Law, LLC

(57) ABSTRACT

A power supply system comprises: a switched-capacitor converter, a controller, and a monitor. Via generation of control signals, the controller controls settings of switches in the switched-capacitor converter to convert a received input voltage to an output voltage that powers a load. The monitor in the power supply system at least occasionally determines an impedance associated with the switched-capacitor converter. A magnitude of the determined impedance provides an indication whether the switched-capacitor converter is operating efficiently. To ensure efficient operation of the switched-capacitor converter, based on input form the monitor, the controller adjusts the control signals controlling the switches in the switched-capacitor converter as a function of the determined impedance.

41 Claims, 12 Drawing Sheets

(51) Int. Cl.
*H02M 3/07* (2006.01)
*H02M 3/158* (2006.01)

(58) Field of Classification Search
CPC ...... H02M 3/137; H02M 3/139; H02M 3/142; H02M 3/155; H02M 3/157; H02M 3/1588; H02M 1/0003; H02M 1/0009; H02M 1/0016; H02M 1/0019; H02M 1/0025; H02M 1/0058; H02M 1/0067; H02M 1/0077; H02M 1/0085; H02M 1/0095; H02M 1/14; Y02B 70/10
USPC ....... 363/15, 21.02, 21.03, 62, 65, 123, 124, 363/157; 323/205, 208–211, 271–275, 323/280, 282–285, 351
See application file for complete search history.

(56) References Cited

U.S. PATENT DOCUMENTS

| | | | |
|---|---|---|---|
| 9,413,229 | B2 | 8/2016 | Fleming |
| 10,122,256 | B1 | 11/2018 | Babazadeh et al. |
| 2005/0219302 | A1* | 10/2005 | Vogeley ................ F04B 43/046 |
| | | | 347/19 |
| 2009/0309499 | A1 | 12/2009 | Agneray et al. |
| 2010/0117612 | A1* | 5/2010 | Klootwijk ........... H01L 27/0805 |
| | | | 323/282 |
| 2015/0077071 | A1* | 3/2015 | Fleming .................. H02M 3/07 |
| | | | 323/268 |
| 2015/0077085 | A1* | 3/2015 | Chen ..................... H02M 3/158 |
| | | | 323/299 |
| 2015/0372592 | A1* | 12/2015 | Floyd ...................... H02M 3/07 |
| | | | 327/536 |
| 2016/0380545 | A1* | 12/2016 | Freeman ................. H02M 1/10 |
| | | | 363/21.01 |
| 2018/0054110 | A1* | 2/2018 | Lim ....................... H02M 1/143 |
| 2018/0301986 | A1* | 10/2018 | Alves ...................... B60L 58/20 |
| 2019/0229623 | A1* | 7/2019 | Tsuda ...................... H02M 3/07 |

OTHER PUBLICATIONS

Li Yanchao et al, "Multilevel modular switched-capacitor resonant converter with voltage regulation", 2017 IEEE Power Electronics Conference and Exposition (APEC), IEEE, Mar. 26, 2017, pp. 88-93, XP033098224.
EP Search Report, EP 19214638.9, dated May 20, 2020, pp. 1-8.
Maksimovic, et al., "Switched-Capacitor DC-DC Converters for Low-Power On-Chip Applications", 1999, pp. 54-59, IEEE, Colorado Power Electronics Center, University of Colorado.
Office Action, EP 19 214 638.9, dated May 19, 2022, pp. 1-6.
Seeman, Michael Douglas, "Analytical and Practical Analysis of Switched-Capacitor DC-DC Converters", Sep. 1, 2006, pp. 1-67, Technical Report No. UCB/EECS-2006-111, University of California at Berkeley.

* cited by examiner

ON STATE: Q1, Q3, Q5, AND Q8
OFF STATE: Q2, Q4, Q6, AND Q7

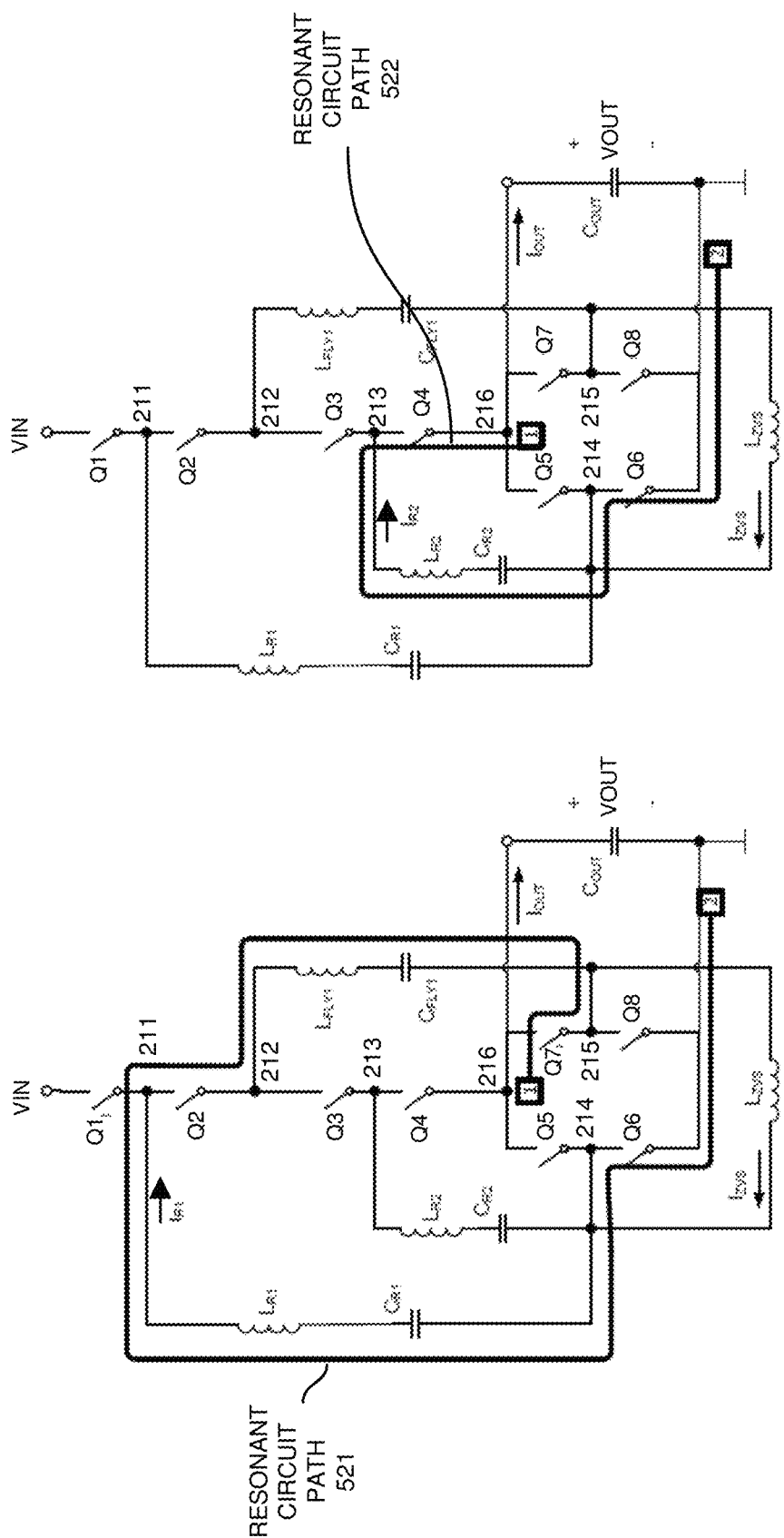

ADAPTIVE CONTROL OF A SWITCHED VOLTAGE CONVERTER

BACKGROUND

As its name suggests, a conventional switched-capacitor DC-DC converter converts a received input voltage into an output voltage.

In one conventional application, the input voltage to the conventional switched-capacitor converter falls in a range between 40 VDC to 60 VDC. In such an instance, switches in the switched-capacitor converter are controlled to transfer charge amongst capacitors also in the switched-capacitor converter, resulting in conversion of the input voltage such as a 48 VDC to an output voltage such as 12 VDC for a 4:1 switched-capacitor converter.

To avoid so-called hard switching in the switched-capacitor converter, the switches in the switched-capacitor converter are preferably switched when there is non-zero voltage across them and non-zero current flowing through them.

The undesirable hard switching in a conventional switched-capacitor converter may be mitigated by placing an inductor in series with the capacitor in each stage of the switched-capacitor converter. This results in resonant (or semi-resonant) switching converter. Such a switched-capacitor converter is sometimes termed a switched tank converter (STC). The resonant tank circuit formed by a series connection of an inductor and capacitor has an associated resonant frequency that is based upon the inductance and capacitance of these components. Switching of the switches in the conventional switched-capacitor converter at the respective resonant frequency results in so-called zero current switching (ZCS), which reduces switching losses and provides good power conversion efficiency.

BRIEF DESCRIPTION

This disclosure includes the observation that electronic components (capacitors, inductors, resistors, etc.) in a respective conventional switched-capacitor converter can degrade over time. For example, due to component degradation, a capacitance of a capacitor, inductance of an inductor, resistance of a resistor may change over time.

Thus, even if a respective switching frequency of a switched-capacitor converter is properly set at a time of initial operation, the resonant frequency of a switched-capacitor converter may change due to changes in capacitance, inductance, changes in thermal environments, etc. In such an instance, the switched-capacitor converter no longer efficiently operates to convert an input voltage to a respective output voltage.

Embodiments herein include novel ways of providing improved performance of a switched-capacitor converter and efficient generation of a corresponding output voltage.

For example, according to one embodiment, a power supply system comprises: a switched-capacitor converter, a controller, and a monitor. The components of the power supply such as the switched-capacitor converter, monitor, controller, etc., can be implemented as hardware (such as circuitry), software, or a combination of both.

Via generation of control signals, the controller controls settings of switches in the switched-capacitor converter to convert a received input voltage to an output voltage that powers a load. The monitor in the power supply system at least occasionally determines (such as predicts, identifies, calculates, etc.) an impedance associated with the switched-capacitor converter. In one embodiment, a magnitude of the determines impedance provides an indication whether the switched-capacitor converter is operating efficiently. To ensure efficient operation of the switched-capacitor converter, the controller adjusts the control signals as a function of the determined impedance.

In accordance with further embodiments, in furtherance of operating the switched-capacitor converter at a desired optimal efficiency, the controller controls one or more parameter settings of the control signals controlling the switched-capacitor converter. For example, in one embodiment, the controller sets (modifies) a frequency of the control signals used to control respective switches in the switched-capacitor converter as a function of the determined impedance. A final frequency of the adjusted control signals generated by the controller corresponds to a substantially minimum impedance setting of the switched-capacitor converter. In other words, the final control signals (including any adjustments) operate the switched-capacitor converter at the substantially minimum impedance.

Further embodiments herein include monitoring one or more operational parameters of the switched-capacitor converter to determine the impedance of the switched-capacitor converter. The operational parameters can include any suitable parameters such as a magnitude of the output voltage, an amount of output current provided by the output voltage to power the load, etc. The monitor determines the impedance of the switched-capacitor converter via settings of the monitored operational parameters. For example, in one embodiment, the switched-capacitor converter determines the impedance of the switched-capacitor converter based dividing the magnitude of the output voltage by the magnitude of the output current. In accordance with further embodiments, the impedance can be provided (by Artificial Intelligence accordingly trained) by a neural network or other machine learning method, like any regression method, etc.

In accordance with yet further embodiments, the monitor determines the impedance of the switched-capacitor converter for each of multiple different frequency settings of the control signal. The monitor determines an impedance of the switched-capacitor converter for each of the multiple different frequency settings. The monitor identifies a particular frequency setting of the multiple frequency settings that results in a lowest determined impedance of the switched-capacitor converter. In one embodiment, the system as described herein controls the frequency, determines, computes or predicts the impedance, etc., during normal operation of the converter driving a load.

As an example of testing different candidate frequencies, the monitor sets a frequency of the control signal to a first frequency and determines a corresponding first impedance of the switched-capacitor converter for the first frequency; the monitor sets a frequency of the control signal to a second frequency and determines a corresponding second impedance of the switched-capacitor converter for the second frequency; the monitor sets a frequency of the control signal to a third frequency and determines a corresponding third impedance of the switched-capacitor converter for the third frequency; and so on.

The monitor (or other suitable resource) then selects amongst the different frequencies (such as first frequency, second frequency, third frequency, etc.) that results in the lowest impedance calculation of the switched-capacitor converter. In one embodiment, the selected frequency corresponds to an overall resonance frequency of the switched-capacitor converter.

It should be noted that testing of the switched-capacitor converter to identify a most desirable operational frequency of the control signals can be executed at any time and in any manner. In one embodiment, the monitor determines an impedance for each of multiple different frequency settings of the control signal during uninterrupted powering of the load via the output voltage. Thus, testing of the switched-capacitor converter can occur while the switched-capacitor converter generates the output voltage to power the load. Occasional testing of the switched-capacitor converter and adjustment of control signals ensures that the switched-capacitor converter is operated at a high efficiency.

Further embodiments herein include determining a best operational frequency of the control signals based on adjusting a frequency (or other suitable control parameter) of the control signals (up or down) and measuring the impedance for the new setting. For example, in one embodiment, the monitor compares the impedance of operating the switched-capacitor converter at the new frequency with respect to a prior frequency setting. The monitor repeatedly adjusts the frequency and performs impedance comparisons of the switched-capacitor converter until the monitor finds a frequency providing the lowest impedance. This frequency corresponds to the resonant frequency of the switched-capacitor converter.

In accordance with further embodiments, based on feedback from the monitor indicating which of multiple tested frequencies provides a most desirable impedance measurement, the controller generates the adjusted control signals, which operate switches in the switched-capacitor converter at the resonant frequency.

In accordance with yet further embodiments, the switched-capacitor converter includes multiple resonant circuit paths, each of which operates at approximately or substantially the same resonant frequency. The collective control of respective currents through the multiple circuit paths (via control of the switches) generates the output voltage to power the load. The controller applies the adjusted control signals to the switched-capacitor converter to operate the switched-capacitor converter at the resonant frequency of the multiple resonant circuit paths.

In still further embodiments, the monitor is further operable to: monitor a magnitude of the output voltage (Vout) as well as monitor a magnitude of an output current (Iout) supplied by the output voltage to the load. The monitor determines the impedance of the switched-capacitor converter based on the magnitude of the magnitude of the output voltage and the magnitude of the output current. In one non-limiting example embodiment, the monitor determines the impedance of the switched-capacitor converter as being equal to the value, (Vout/Iout).

Further embodiments herein include determining whether the switched-capacitor converter is currently operated within a desired efficiency range. For example, in one embodiment, the monitor determines an impedance of the switched-capacitor converter for a current frequency setting the control signals. The monitor compares the determined impedance to a threshold value or desired range. In response to detecting that the determined impedance is above the threshold value outside of the range, the monitor determines the impedance of the switched-capacitor converter for each of multiple different frequency settings of the control signals to identify a particular frequency setting of the multiple frequency settings that results in a substantially lowest determined impedance switched-capacitor converter. The controller then adjusts a frequency of the control signals to the particular frequency setting to generate the output voltage to power the load.

Further embodiments herein include testing operation of the switched-capacitor converter at different frequencies during steady state conditions. For example, in one embodiment, the monitor monitors an operational state and corresponding parameters of the switched-capacitor converter. In response to detecting that the switched-capacitor converter operates in a transient mode such as when the load consumes different amounts of current, the monitor prevents activation of an adjustor (adjustment circuit) and adjustment of the control signals at different frequencies because the impedance cannot be easily measured during such a state. Conversely, in response to detecting that the switched-capacitor converter operates in steady state mode in which the load consumes a substantially same amount of current such as for a given duration of time, the monitor activates the adjustment circuit that adjusts the control signal. In one embodiment, modal control of the switched-capacitor converter is achieved via application of Artificial Intelligence.

Thus, embodiments herein include improving performance of a Zero Voltage Switching Capacitor Converter (ZSC) by adjusting an operational parameter such as its switching frequency. The time of applying an adjustment can be determined by the means of predicate maintenance and the value change by a classical or statistical optimization scheme or even by machine learning methods including reinforcement learning.

These and other more specific embodiments are disclosed in more detail below.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate adjustment of a switched-capacitor converter. The instructions, when executed by computer processor hardware, cause the computer processor hardware (such as one or more co-located or disparately located processor devices or hardware) to: produce a control signal, the control signal controlling operation of a switched-capacitor converter that generates an output voltage to power a load; determine an impedance of the switched-capacitor converter; and adjust the control signal as a function of the determined impedance.

Another embodiment herein includes a computer readable storage medium and/or system having instructions stored thereon to facilitate adjustment of a switched-capacitor converter. The instructions, when executed by computer processor hardware, cause the computer processor hardware (such as one or more co-located or disparately located processor devices or hardware) to: produce control signals, the control signals controlling operation of a switched-capacitor converter that generates an output voltage to power a load; adjust a frequency setting of the control signals; determine an impedance value for each of multiple different frequency settings of the control signals to identify a particular frequency setting of the multiple different frequency settings that results in a lowest determined impedance of the switched-capacitor converter; and set a frequency of the control signal to the particular frequency.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to controlling operation of a switched-capacitor converter, the concepts disclosed herein may be advantageously applied to any other suitable topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIGS. 5A and 5B are example diagrams illustrating settings of switches and resonant circuit paths of a switched-capacitor converter according to embodiments herein.

Figure 1:
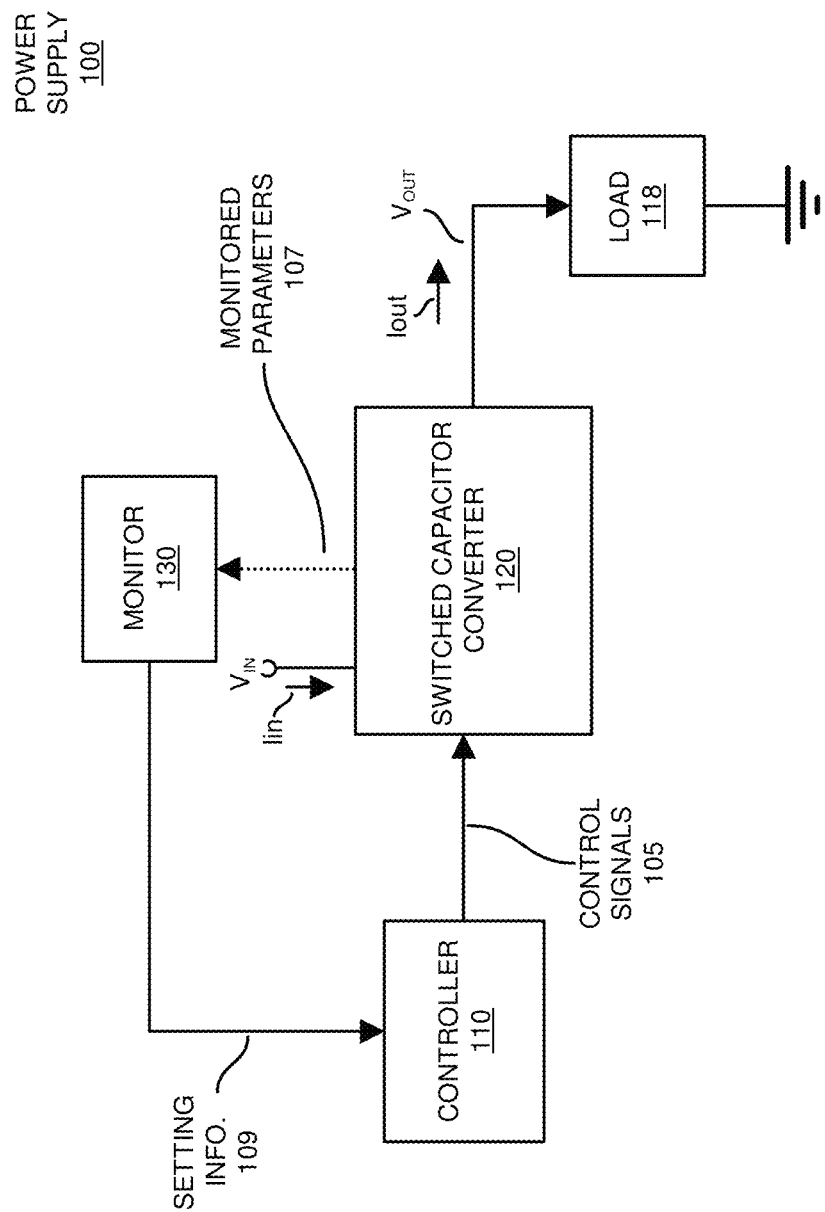
FIG. 1 is an example diagram illustrating a controller and a power supply including a switched-capacitor converter according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, a power supply system comprises: a switched-capacitor converter, a controller, and a monitor. Via generation of control signals, the controller controls settings of switches in the switched-capacitor converter to convert a received input voltage to an output voltage that powers a load. The monitor in the power supply system at least occasionally determines (predicts, identifies, calculates, etc.) an impedance associated with the switched-capacitor converter. In one embodiment, magnitudes of determined impedances at different settings provides an indication whether the switched-capacitor converter is operating efficiently. To ensure efficient operation of the switched-capacitor converter, the controller adjust the control signals controlling the switched-capacitor converter as a function of the determined impedance. For example, the controller identifies a desired frequency amongst multiple possible frequencies in which to adjust the control signals.

FIG. 1 is an example diagram illustrating a power supply including a switched-capacitor converter according to embodiments herein.

As shown in this example embodiment, power supply 100 includes a switched-capacitor converter 120, a controller 110, and a monitor 130.

Note that each of the resources as described herein can be instantiated in a suitable manner. For example, each of the controller 110, switched-capacitor converter 120, monitor 130, etc. can be instantiated as hardware (such as circuitry), software (executed instructions), or a combination of both.

During operation, the switched-capacitor converter 120 receives the input voltage (Vin, such as a DC input voltage) and converts it into the output voltage (Vout, such as a DC output voltage) to power the load 118. Controller 110 controls switching of circuit paths in the switched-capacitor converter 120 via generated control signals 105 (such as one or more pulse width modulation signals).

In one embodiment, the impedance of the switched-capacitor converter 120 varies depending on a frequency or pulse width modulation setting of the control signals 105 inputted to the switched-capacitor converter 120.

By further way of non-limiting example embodiment, the monitor 130 monitors one or more operational parameters 107 of the power supply 100 to ensure efficient operation of the switched-capacitor converter 120. Based on monitoring of the parameters 107, the monitor 130 identifies and selects an appropriate frequency in which to generate the corresponding control signals 105.

More specifically, in one embodiment, the power supply 100 monitors one or more parameters 107 such as input voltage Vin, input current Iin, output voltage Vout, and output current Iout, etc., of the switched-capacitor converter 120 to determine (such as calculate, identify, etc.) an impedance of the switched-capacitor converter 120. In one embodiment, the power supply 100 implements artificial intelligence to determine the impedance of the switched-capacitor converter 120.

The impedance of the switched-capacitor converter 120 can be determined in any suitable manner. For example, in one embodiment, the monitor determines the impedance (such as based on Vout/Iout) of the switched-capacitor converter 120 via settings of the monitored operational parameters 107.

Further embodiments herein include calculating a respective impedance of the switched-capacitor converter 120 for each of multiple different settings of the control signals and then selecting a setting of the control signals 105 that corresponds to the minimum impedance of the switched-capacitor converter 120.

Thus, to ensure efficient operation of the switched-capacitor converter 120, via setting information 109, the monitor 130 communicates with the controller 110 to adjust the control signals 105 as a function of the determined impedance. For example, in one embodiment, during generation of the output voltage, the controller 110 controls one or more parameter settings of the control signals 105 controlling the switched-capacitor converter 120. The controller 110 sets (or modifies) a frequency of the control signals 105 used to control respective switches in the switched-capacitor converter 120 as a function of the determined impedance.

In one embodiment, the frequency of the adjusted control signals generated by the controller 110 corresponds to a substantially minimum impedance setting of the switched-capacitor converter 120. In other words, adjustment of the control signals 105 based on setting information 109 selected by the monitor 130 operates the switched-capacitor converter 120 at the substantially minimum impedance.

Figure 2:
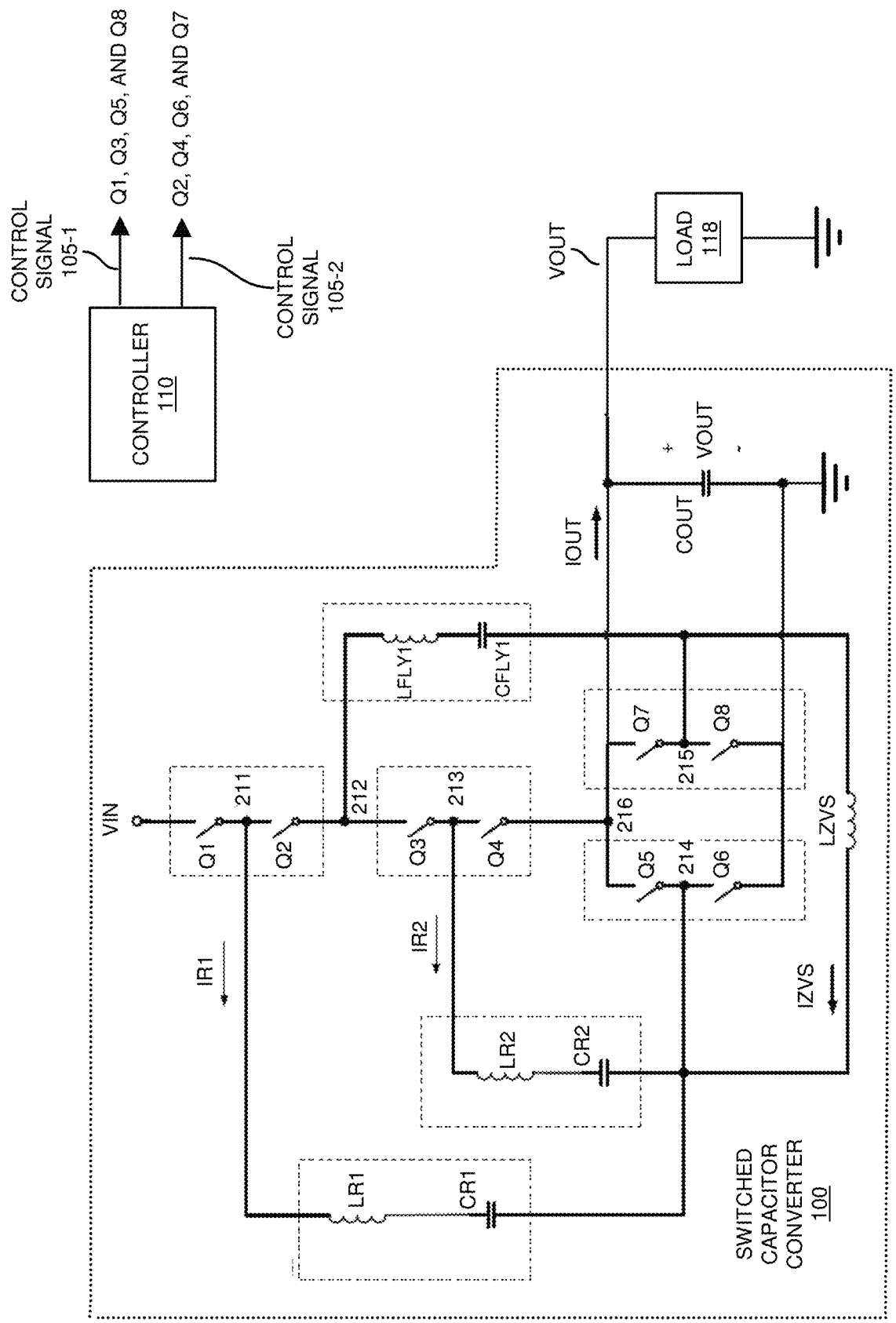
FIG. 2 is an example diagram illustrating a controller and a switched-capacitor converter according to embodiments herein.

FIG. 2 is an example diagram illustrating a switched-capacitor converter according to embodiments herein.

As shown, the switched-capacitor converter 120 (circuit) includes multiple switches Q1, Q2, Q3, Q4, Q5, Q6, Q7, and Q8.

The switched-capacitor converter 120 further includes multiple circuit components including inductor LR1, capacitor CR1, inductor LR2, capacitor CR2, inductor Lzvs, inductor Lfly, and capacitor Cout.

In this example embodiment, a first terminal of the switch Q1 is connected to input voltage Vin; a second terminal of the switch Q1 is connected to the node 211. A first terminal of the switch Q2 is connected to the node 211; a second terminal of the switch Q2 is connected to the node 212. A first terminal of the switch Q3 is connected to the node 212; a second terminal of the switch Q3 is connected to the node 213. A first terminal of the switch Q4 is connected to the node 213; a second terminal of the switch Q2 is connected to the node 216.

The series combination of inductor LR1 and capacitor CR1 extends between node 211 and node 214. The series combination of inductor LR2 and CR2 extends between node 213 and node 214. The series combination of inductor Lfly1 and Cfly1 extends between node 212 and node 215. The inductor Lzvs extends between node 215 and node 214.

Further, a first terminal of the switch Q5 is connected to node 216; a second terminal of the switch Q5 is connected to the node 214. A first terminal of the switch Q6 is connected to node 214; a second terminal of the switch Q6 is connected to the ground reference voltage. A first terminal of the switch Q7 is connected to node 216; a second terminal of the switch Q7 is connected to the node 215. A first terminal of the switch Q8 is connected to node 218; a second terminal of the switch Q6 is connected to the ground reference voltage.

Capacitor Cout is coupled between node 216 and the ground voltage reference.

As further shown, during operation, the controller 110 produces control signals 105-1 and 105-2. Control signal 105-1 controls a state of each of the switches Q1, Q3, Q5, and Q8. Control signal 105-2 controls a state of each of the switches Q2, Q4, Q6, and Q7.

The switches can be any suitable devices such as field effect transistors, bipolar junction transistors, etc.

In one embodiment, the capacitances of the capacitors fall in a range between 5 and 100 microfarads. However, the capacitors CR1 and CR2 can be any suitable value depending on the embodiment.

The inductors Lzvs, LR1, and LR2 can be any suitable value as well. In one embodiment, the inductances fall in a range between 25 and 200 nanohenries. If desired, each of the inductors is simply a respective circuit path of an electronic device having a corresponding parasitic inductance value.

Figure 3:
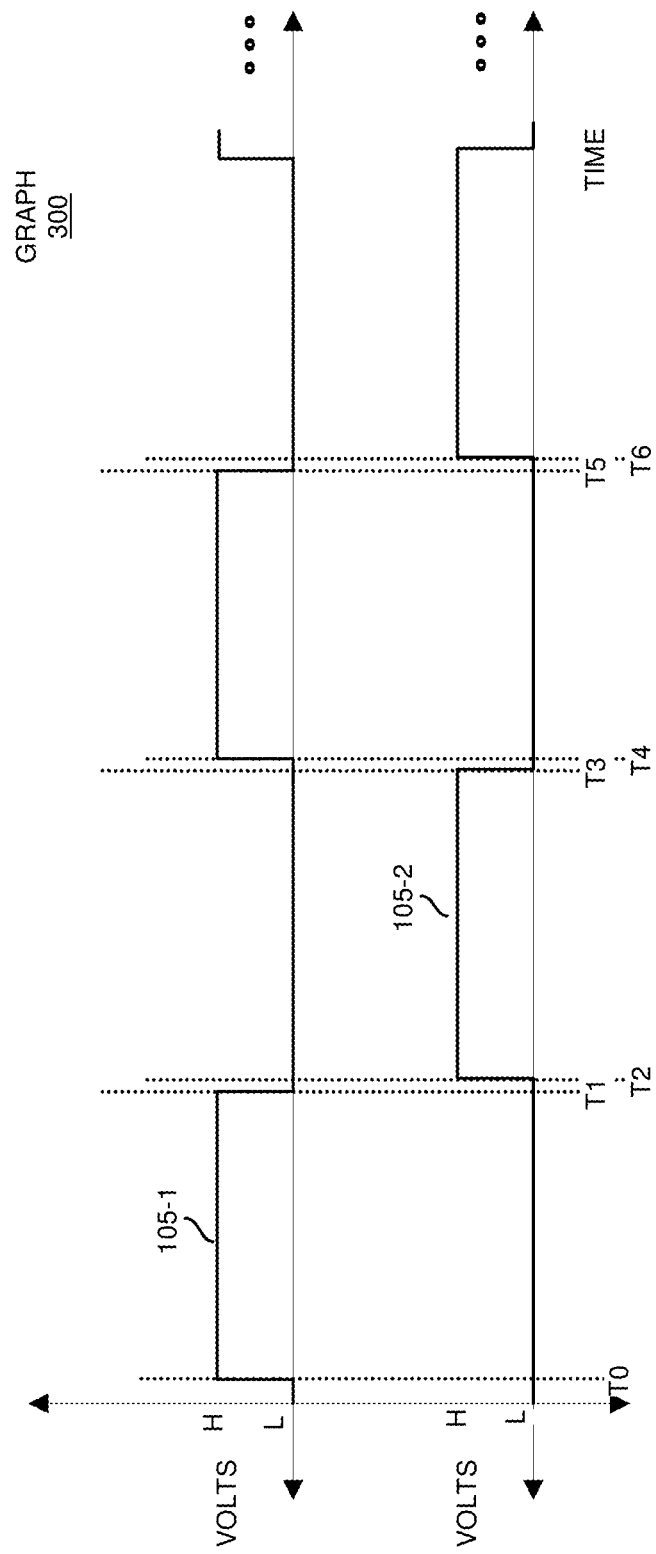
FIG. 3 is an example diagram illustrating signals that control switches in a switched-capacitor converter according to embodiments herein.

FIG. 3 is an example diagram illustrating generation of controls signals to control a switched-capacitor converter according to embodiments herein.

In general, as shown in graph 300, the controller 110 produces the control signal 105-1 to be an inversion of control signal 150-2. The time between T1 and time T2, time between time T3 and time T4, etc., represent so-called dead time during which all of the switches are deactivated to the OFF state (high impedance or open circuit).

Thus, between time T2 and time T3, when the control signal 105-1 (at a logic lo) controls the set of switches Q1, Q3, Q5 and Q8, to an OFF state, the control signal 105-2 (logic hi) controls the set of switches Q2, Q4, Q6 and Q7, to an ON state (low impedance or short circuit).

Conversely, between time T3 and time T4, when the control signal 105-1 (logic hi) controls the set of switches Q1, Q3, Q5 and Q8, to an ON state, the control signal 105-1 controls the set of switches Q2, Q4, Q6 and Q7, to an OFF state.

In one embodiment, the controller 110 controls the frequency of the control signals to be around 600 KHz (KiloHertz), although the control signals 105 can be generated at any suitable frequency.

Additionally, the controller 110 controls the pulse duration of the control signals 105 to be around 50%, although the control signals 105 can be generated at any suitable pulse width modulation value.

Referring again to FIG. 2, control of the switches in the switched-capacitor converter 120 using the control signals 105 results in conversion of the input voltage Vin to the output voltage Vout.

In one non-limiting example embodiment, switched-capacitor converter 120 is a 4:1 ZSC converter. In such an instance, when the input voltage Vin is 48 VDC, switching of the respective switches converts the 48 VDC input voltage to the output voltage of Vout=12 VDC. Attributes of the switched-capacitor converter 120 can be modified to convert any input voltage level to a respective output voltage level.

Figure 4B:
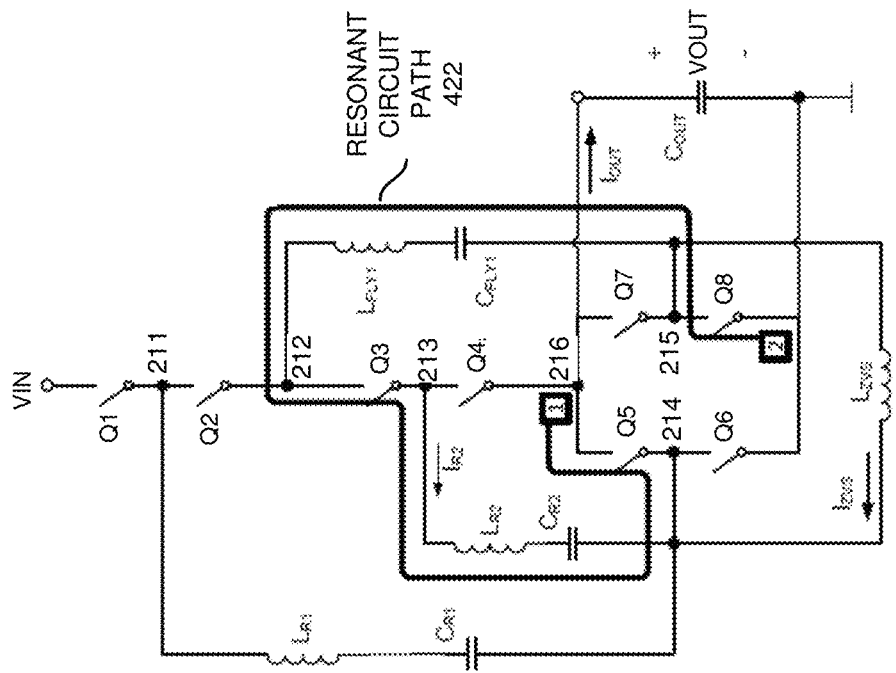
FIGS. 4A and 4B are example diagrams illustrating settings of switches and respective resonant circuit paths of a switched-capacitor converter according to embodiments herein.
Figure 4A:
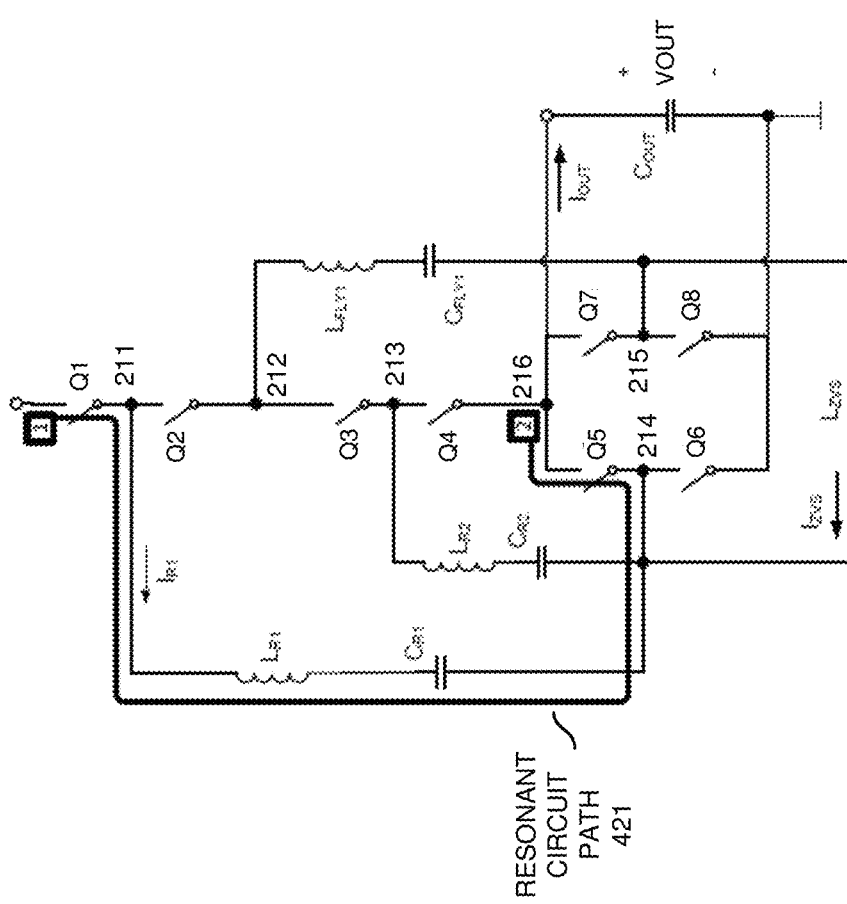

FIGS. 4A and 4B are example diagrams illustrating a charge mode and corresponding settings of switches in respective resonant circuit paths of a switched-capacitor converter according to embodiments herein.

As shown, the switched-capacitor converter 120 includes multiple resonant circuit paths (such as resonant circuit paths 421 and 422 in FIGS. 4A and 4B or resonant circuit paths 521 and 522 in FIGS. 5A and 5B), each of which operates at approximately or substantially the same resonant frequency based on selected settings of the inductor and capacitor components.

Note that the collective control of respective currents through the multiple circuit paths (via control of the switches Q1-Q8) generates the output voltage Vout to power the load 118. The controller 110 applies the adjusted control signals 105 to the switched-capacitor converter 120 to operate the switched-capacitor converter 120 at the substantially common resonant frequency of the multiple resonant circuit paths.

To keep the efficiency of the switched-capacitor converter 120 at a maximum, ideally, the resonance frequency of each of the resonant tanks substantially match each other.

In general, a resonant tank frequency can be described by:

$$f\text{res}=1/[2\cdot\pi\cdot\sqrt{(C\text{res}\cdot L\text{res})}]$$

Note that it may be challenging to achieve a perfect matching of resonant frequencies of respective circuit paths in the switched-capacitor converter 120 due to capacitor tolerances and variations of the resonant inductors (Lr) and the impact of Lr3. In addition to the tolerances and Lr3, there may be different resonant loops in the topology depending on the mode (charging, discharging). This results in four different resonant frequencies, even with perfect or near perfect component matching.

As shown in FIG. 4A, when Q1 and Q5 are both ON (low impedance path) such as between time T0 and time T1, the resonant circuit path 421 (combination of series connected inductor LR1 and capacitor CR1) of the switched-capacitor converter 120 is activated.

In this example embodiment, resonant circuit path 421 has a resonant frequency of:

$$f\text{res}(421)=1/[2\pi\cdot\sqrt{(CR1\cdot LR1)}]$$

As shown in FIG. 4B, when Q3, Q5, and Q8 are all ON (low impedance path) such as between time T2 and time T3, the resonant circuit path 422 (combination of series connected inductor LR2 and capacitor CR2 and inductor Lfly1 and capacitor Cfly1) of the switched-capacitor converter 120 is activated.

In this example embodiment, resonant circuit path 422 has a resonant frequency of:

$$f\text{res}(422)=1/[2\pi\cdot\sqrt{(CR2\cdot(LR2+LR3))}]$$

FIGS. 5A and 5B are example diagrams illustrating a discharge mode and corresponding settings of switches in resonant circuit paths of a switched-capacitor converter according to embodiments herein.

As shown in FIG. 5A, because Q2, Q6, and Q7 are all ON (low impedance path) between time T2 and time T3, the resonant circuit path 521 (combination of series connected inductor LR1 and capacitor CR1 and inductor Lfly1 and capacitor Cfly1) of the switched-capacitor converter 120 is activated to generate the output voltage Vout.

In this example embodiment, resonant circuit path 521 has a resonant frequency of:

$$f\text{res}(521)=1/[2\cdot\pi\cdot\sqrt{(CR1\cdot(LR1+LR3))}]$$

As shown in FIG. 5A, because Q4 and Q6 are both ON (low impedance path) between time T2 and time T3, the resonant circuit path 522 (combination of series connected inductor LR2 and capacitor CR2) of the switched-capacitor converter 120 is activated to generate the output voltage Vout.

In this example embodiment, resonant circuit path 522 has a resonant frequency of:

$$f\text{res}(522)=1/[2\cdot\pi\cdot\sqrt{(CR2\cdot LR2)}]$$

Figure 6:
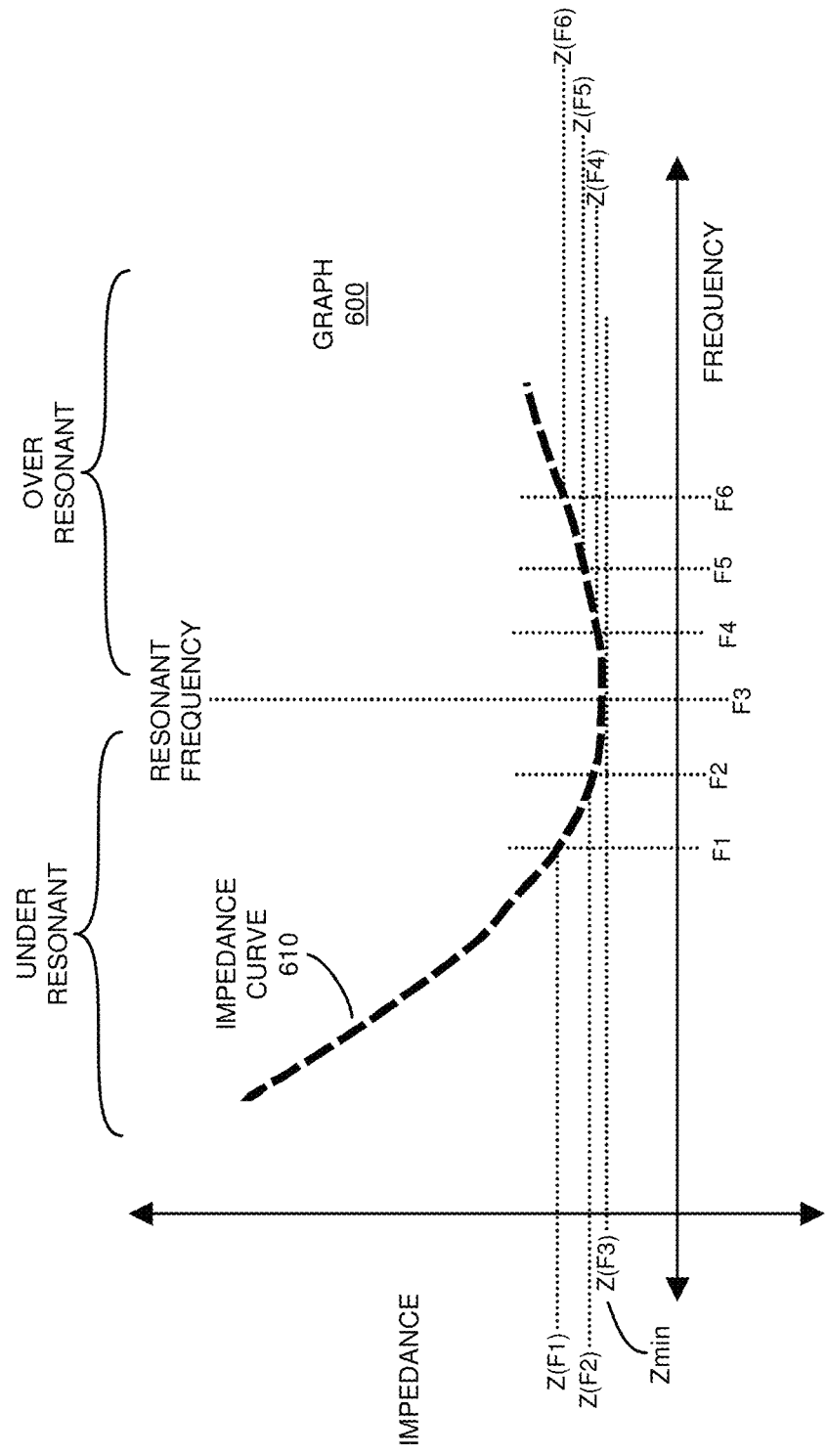
FIG. 6 is an example graph illustrating magnitudes of the output impedance of the switched-capacitor versus frequency according to embodiments herein.

FIG. 6 is an example graph illustrating magnitudes of the output impedance of the switched-capacitor converter over different tested frequencies according to embodiments herein.

As shown, the impedance curve 610 in graph 600 indicates different impedance values of the switched-capacitor converter 120 for different frequencies.

For example, the impedance of the switched-capacitor converter 120 at frequency F1 is impedance Z(F1); the impedance of the switched-capacitor converter 120 at frequency F2 is impedance Z(F2); the impedance of the switched-capacitor converter 120 at frequency F3 is impedance Z(F3); the impedance of the switched-capacitor converter 120 at frequency F4 is impedance Z(F4); and the impedance of the switched-capacitor converter 120 at frequency F5 is impedance Z(F5).

In this example embodiment, the resonant frequency of the switched-capacitor converter 120 is frequency F3. Frequencies above F3 represent over resonant operating conditions; frequencies below F3 represent under resonant operating conditions.

It is desirable that the controller 110 generate the control signals 105 at the resonant frequency F3 to achieve highest efficiency (best power conversion ratio) of converting the input voltage Vin to the output voltage Vout.

In one embodiment, the monitor 130 causes the controller 110 to set a frequency of the control signals 105 to a first frequency such as F1 and determines a corresponding first impedance of the switched-capacitor converter 120 for the first frequency; the monitor 130 sets a frequency of the control signals 105 to a second frequency such as F2 and determines a corresponding second impedance of the switched-capacitor converter 120 for the second frequency; the monitor 130 sets a frequency of the control signals 105 to a third frequency such as F3 and determines a corresponding third impedance of the switched-capacitor converter 120 for the third frequency; and so on.

The monitor 130 then selects amongst the different frequencies (such as first frequency, second frequency, third frequency, etc.), the frequency that results in the lowest impedance calculation of the switched-capacitor converter 120.

It should be noted that testing of the switched-capacitor converter 120 to identify a most desirable operational frequency of the control signals 105 can be executed at any time and in any manner. For example, in one embodiment, the monitor 130 determines an impedance for each of the multiple different test frequency settings of the control signals 105 during uninterrupted powering of the load 118 via the output voltage Vout. Thus, testing of the switched-capacitor converter 120 can occur while the switched-capacitor converter 120 uninterruptedly generates the output voltage Vout to power the load 118.

As further discussed below, when testing different frequencies, it is desirable to start increasing the frequency of the control signals 105 to determine if the current frequency setting of the control signals 105 is the resonance frequency of the switched-capacitor converter 120 because of the steepness (resulting in poorer efficiency) of the impedance curve 610 below resonance frequency F3. This helps to ensure that the switched-capacitor converter 120 is operated in an efficient mode. Selection of frequencies lower than FIG. 3 result in a much lower efficiently operation of the switched-capacitor converter 120.

Figure 7:
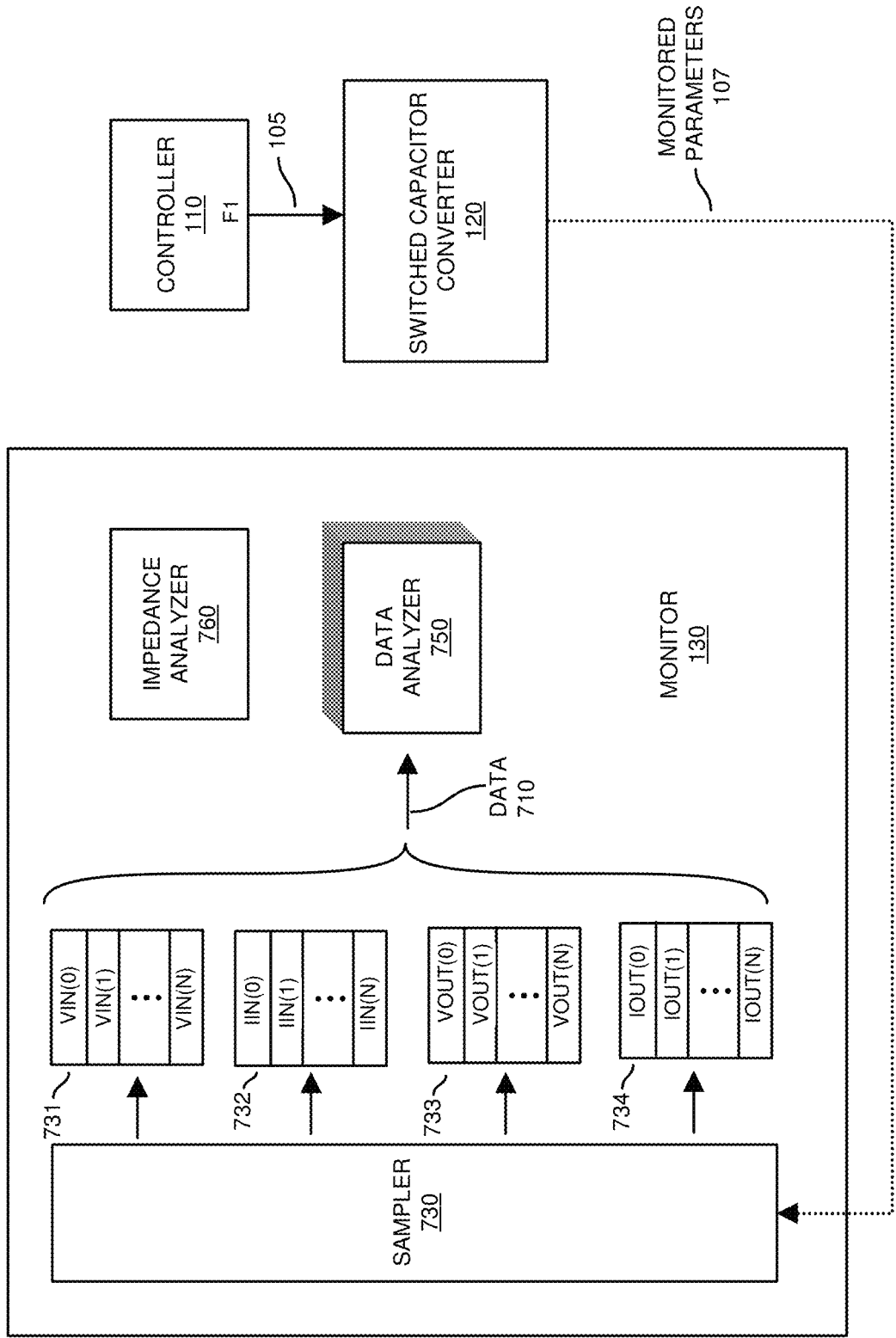
FIG. 7 is an example diagram illustrating analysis of multiple power supply parameters according to embodiments herein.

FIG. 7 is an example diagram illustrating analysis of multiple power supply parameters according to embodiments herein.

In this example embodiment, the monitor 130 includes sampler 730, buffer 731, buffer 732, buffer 733, buffer 734, data analyzer 750, and impedance analyzer 760. Note that any of the functionality provided by these components can be implemented as software or as dedicated electronic hardware circuitry (or any combination thereof).

As shown, the sampler 730 receives the monitored parameters 107 from the switched-capacitor converter 120. As previously discussed, the monitored parameters 107 can include the input voltage Vin, input current Iin, output voltage Vout, and output current Iout.

In one embodiment, the sampler 730 includes an analog to digital converter and stores corresponding samples of the different monitored parameters 107 in respective buffers.

More specifically, the sampler 730 stores input voltage sample values in buffer 731; the sampler 730 stores input current sample values in buffer 732; the sampler 730 stores output voltage sample values in buffer 733; the sampler 730 stores output current sample values in buffer 734.

Note that the data analyzer 750 of monitor 130 can be configured to determine whether or not to perform frequency testing to identify best operating frequency of generating the respective control signals 105. In one embodiment, the data analyzer 750 applies a set of rules to determine if a current time it is appropriate to perform impedance testing of the switched-capacitor converter 120.

Note that testing to identify the best operating frequency as described herein can occur on a scheduled basis, random basis, etc.

Further in this example embodiment, the monitor 130 includes a data analyzer 750 to test whether the switched-capacitor converter 120 operates in a steady state output voltage mode or a transient output voltage mode.

In one embodiment, it may be desired to test operation of the switched-capacitor converter 120 at different frequencies during steady only state conditions. For example, in one embodiment, the monitor 130 monitors an operational state of the switched-capacitor converter 120. In response to detecting that the switched-capacitor converter 120 operates in a transient mode such as when the load 118 consumes different amounts of current, the monitor 130 prevents activation of an impedance analyzer 760 and corresponding adjustments to the control signals 105 at different frequencies because the impedance of the switched-capacitor converter 120 cannot be accurately measured during such a transient power consumption state.

Conversely, in one embodiment, in response to detecting that the switched-capacitor converter 120 operates in steady state mode in which the load 118 consumes a substantially same amount of current such as for a given duration of time, if testing or recalibration is scheduled and/or desired, the monitor 130 activates the impedance analyzer 760.

In one embodiment, to save on power consumption, the data analyzer 750 determines appropriate times when to provide power to the impedance analyzer 760. The data analyzer 750 generates one or more control signals (such as control signal 720 in FIG. 8) to control activation of the data analyzer 750. When powered, as further discussed below, the impedance analyzer 760 performs frequency/impedance testing to identify a resonance frequency in which to generate the control signals 105.

Figure 8:
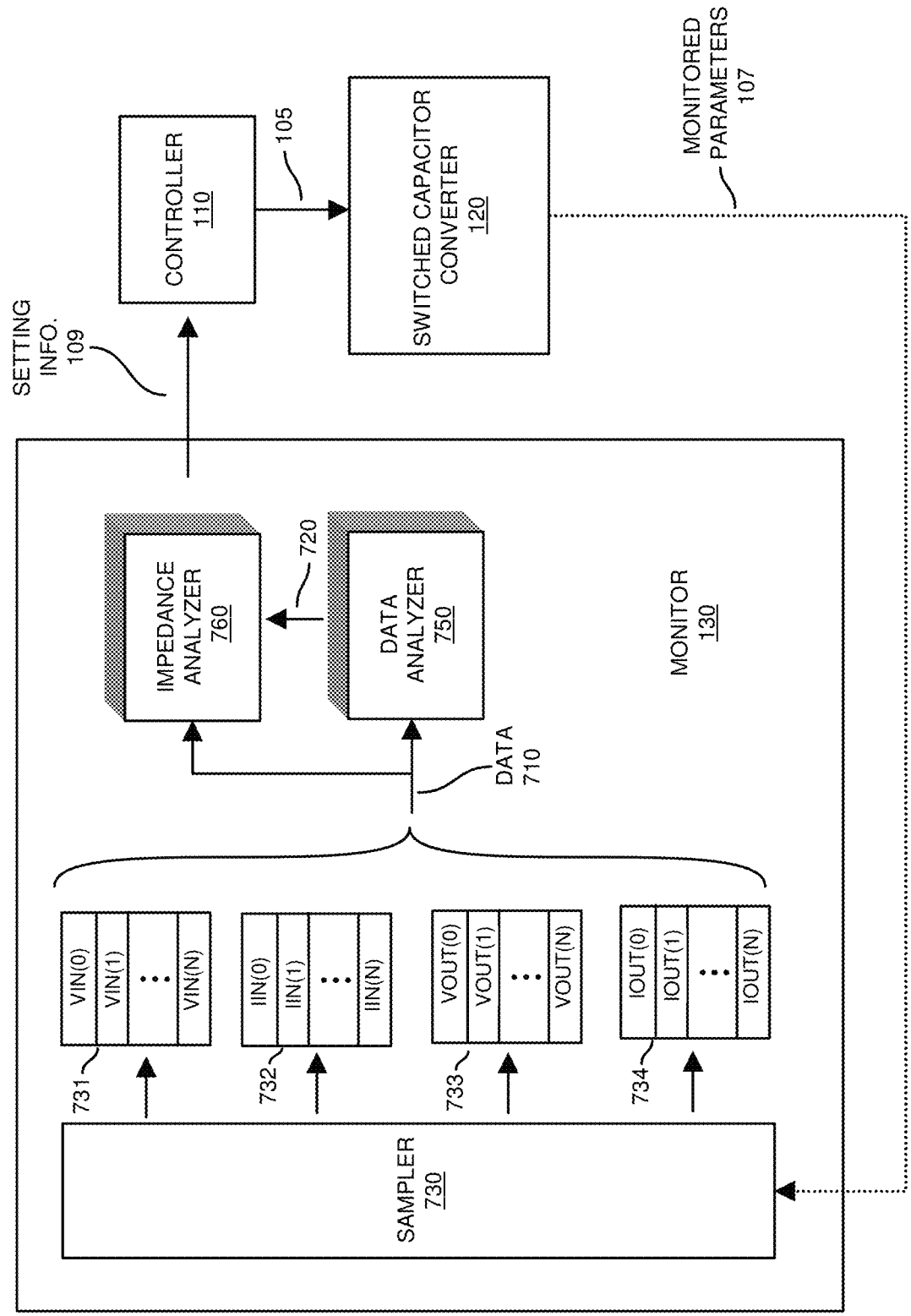
FIG. 8 is an example diagram illustrating analysis of power supply parameters and testing of a switched-capacitor converter at multiple different frequencies according to embodiments herein.

FIG. 8 is an example diagram illustrating analysis of power supply parameters and testing of a switched-capacitor converter at multiple different frequencies according to embodiments herein.

Assume that a trigger event occurs indicating to test the operation of the switched-capacitor converter 120 at different frequencies to ensure that it is operating properly. Data analyzer 750 detects the trigger event indicating it is an appropriate to implement testing.

In response to detecting (such as via implementation of a neural network) a condition in which impedance/frequency testing is appropriate or desired, the data analyzer 750 initiates powering and/or activating of the impedance analyzer 760 (for predictive maintenance as previously discussed). In one embodiment, after the data analyzer 750 (such as a filtering network) detects that the switched-capacitor converter 120 operates in a steady-state, the data analyzer 750 activates (via control signal 720) the impedance analyzer 760 (impedance predictor such as implemented via artificial intelligence or other suitable manner) to identify a best setting of control signals 105 to most efficiently operate the switched-capacitor converter 120.

In one embodiment, as further discussed below, and to identify best frequency setting for the control signals 105, the monitor 130 monitors a magnitude of the output voltage (Vout) as well as monitors a magnitude of an output current (Iout) supplied by the output voltage to the load 118 for each test frequency setting. The monitor 130 determines the impedance of the switched-capacitor converter 120 based on the magnitude of the output voltage Vout and the magnitude of the output current Iout for the test frequency setting.

In one non-limiting example embodiment, the monitor 130 determines the impedance of the switched-capacitor converter 130 for a given test frequency (of control signals 105) as being equal to the value, (Vout/Iout). One embodiment herein includes implementing a neural network approach in case the system load isn't periodic or higher accuracy is needed. If desired, the magnitude of Vout can be a filtered value derived multiple sampled store in buffer 733; the magnitude of Iout can be a filtered value derived multiple sampled store in buffer 734.

Additional details of testing the switched-capacitor converter 120 at multiple different frequencies is further discussed below.

Figure 9:
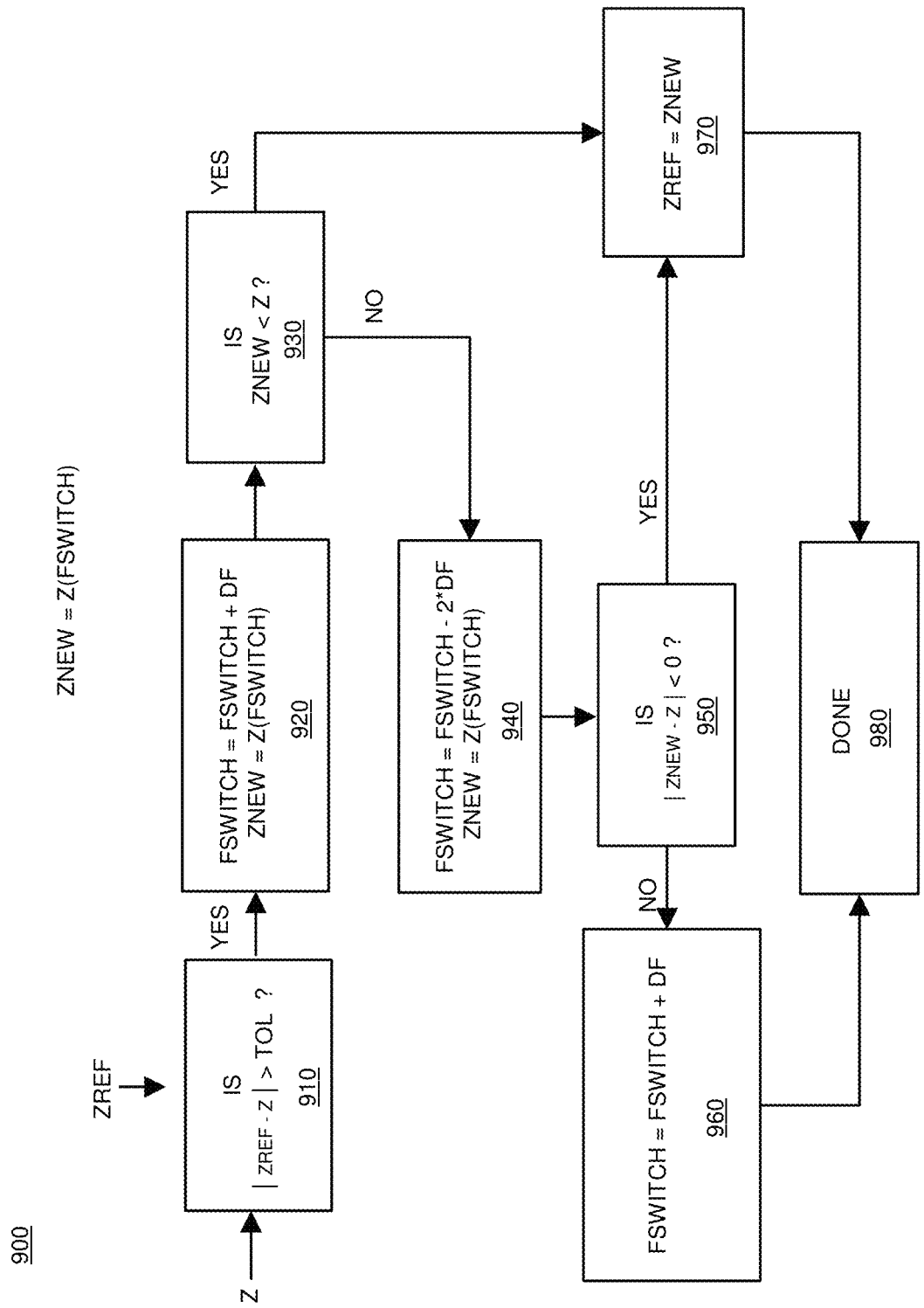
FIG. 9 is an example diagram illustrating application of multiple frequency adjustments and determination of a resonant frequency of the switched-capacitor converter according to embodiments herein.

FIG. 9 is an example diagram illustrating application of multiple frequency adjustments and determination of a resonant frequency of the switched-capacitor converter according to embodiments herein.

Further embodiments herein include a method that supports adjusting the switching frequency of the control signals 105 if the impedance if the switched-capacitor converter 120 increases above a certain threshold. In certain instances, it can be assumed that the change of impedance associated with the semiconductor material 120 takes place continuously and slowly over time (compared to the amount of impedance checks or even the switching cycles) due to degradation of respective components such as CR1, CR2, LR1, LR2, etc.

In a general nonlimiting example embodiment, during testing, the monitor 130 increases the frequency slightly by DF and measuring the impedance again. If the new impedance value is lower than the previously measured, the monitor 130 keeps the slightly elevated switching frequency, which means the system was previously in a slightly over-resonant case. If the impedance increased further, the system must have been in an under-resonant case and we are therefore reducing the frequency. If increasing and decreasing the switching frequency lead to increasing impedance values, the old switching frequency will be kept until the next update is triggered.

Now, more specifically, in processing operation 910 of method 900, the monitor 130 (such as data analyzer 760) determines whether the switched-capacitor converter 120 is currently operated within a desired impedance range or within tolerance TOL of a desired setpoint. For example, in one embodiment, the monitor 130 determines a current impedance of the switched-capacitor converter 120 for a current implemented frequency setting of the control signals 105. The monitor then compares the determined impedance Z for the switched-capacitor converter 120 to a threshold value Zref (which represents a nominal expected impedance of the switched-capacitor converter 120).

As further discussed in multiple processing operations below, in response to detecting that the determined impedance Z falls outside of a desirable range or above or below a threshold value, the monitor 130 continues with subsequent processing operation to determine the impedance of the switched-capacitor converter 120 for each of multiple different test frequency settings of the control signals 105 to identify a particular frequency setting of the multiple frequency settings that results in a substantially lowest determined impedance switched-capacitor converter 120. The controller 110 then adjusts a frequency of the control signals 105 to the particular frequency setting to generate the output voltage Vout to power the load 118.

More specifically, in processing operation 910, in response to detecting that the absolute value of Zref−Z>TOL, the monitor 120 executes processing operation 920.

In processing operation 920, the monitor 130 adjusts the frequency at which the controller 110 generates the control signals 105. For example, the monitor 130 notifies the controller 110 to increase the current switching frequency (FSWITCH) of the control signals 105 to FSWITCH+DF, where DF is an incremental frequency adjustment and value. In a manner as previously discussed, the sampler 730 monitors the power supply parameters 107 and stores respective sample values in buffers. The impedance analyzer 760 determines an impedance Z(FSWITCH) for the tested new frequency and stores it as ZNEW.

Note that the change, DF, in the switching frequency can be set to a value as small as possible, so that the switched-capacitor converter is kept as close to steady-state as possible and it has to be large enough to produce a measurable change in the impedance.

In processing operation 930, the impedance analyzer 760 compares a magnitude of ZNEW to the original value Z. If ZNEW is less than Z, the monitor 130 continues at processing operation 970. Alternatively, if ZNEW is greater than Z, the monitor 130 continues at processing operation 940.

In processing operation 970, the monitor 130 sets ZREF=ZNEW. Thereafter, processing operation 980 indicates completion of identifying a best frequency of operating switched-capacitor converter 120.

Alternatively, assume that ZNEW is greater than Z, the monitor 130 continues at processing operation 940. In processing operation 940, because the new frequency FSWITCH+DF resulted in a greater impedance than an impedance for frequency FSWITCH, the monitor 130 sets FSWITCTH to FSWICTH−2*DF and produces a new impedance value ZNEW for this tested frequency. The monitor 130 sets ZNEW=Z(FSWITCH).

In processing operation 950, the monitor 130 compares ZNEW to the original impedance Z. If the absolute value of ZNEW−Z<0, then processing continues at processing operation 970. In processing operation 970, the monitor 130 sets ZREF=ZNEW. Thereafter, processing operation 980 indicates completion of identifying a best frequency of operating switched-capacitor converter 120.

Alternatively, if the absolute value of ZNEW−Z>0 in processing operation 950, then processing continues at processing operation 960 where the monitor sets FSWITCH to FSWITCH+DF.

Subsequent to testing the different possible frequency settings of the control signals 105 via method 900, the impedance analyzer 750 of the monitor 130 communicates final setting information 109 (frequency providing the lowest impedance for switched-capacitor converter 120) to the controller 110.

Referring again to FIG. 6, assume that the current frequency setting of the switched-capacitor converter 120 is frequency F1. As previously discussed, the resonant frequency of the circuit paths may have changed duration to drifting of capacitance or inductances such that frequency F1 is no longer a best setting for the switched-capacitor converter 120.

In accordance with method 900, to identify a best frequency setting for control signals 105, the monitor 900 adjusts the frequency of the control signals 105 to be a test frequency of F2. The monitor 130 detects that the impedance of the switched-capacitor converter 120 Z(F2) is less than impedance Z(F1). Thus, frequency F2 is a better frequency than F1.

In further testing, the monitor 900 adjusts the frequency of the control signals 105 to be a frequency of F3. The monitor 130 detects that the impedance of the switched-capacitor converter 120 Z(F3) is less than impedance Z(F2). Thus, frequency F3 is a better frequency than F2.

In further frequency testing, the monitor 900 adjusts the frequency of the control signals 105 to be a frequency of F4.

The monitor 130 detects that the impedance of the switched-capacitor converter 120 Z(F4) is greater than impedance Z(F3). Thus, frequency F3 is a better frequency than F4. Monitor 130 selects frequency F3 as the best frequency setting.

Thus, via the frequency hunting in method 900, the monitor 130 selects frequency F3 as the resonance frequency in which to operate the switched-capacitor converter 120.

In another example embodiment, assume that the current frequency setting of control signals 105 is initially frequency F4.

According to the method 900, the monitor 900 adjusts (starts by increasing) the frequency of the control signals 105 to be a frequency of F5. In this instance, the monitor 130 detects that the impedance of the switched-capacitor converter 120 Z(F5) is greater than impedance Z(F4). Thus, frequency F4 is a better frequency than F5.

In further testing, the monitor 900 adjusts the frequency of the control signals 105 to be a frequency of F3. The monitor 130 detects that the impedance of the switched-capacitor converter 120 Z(F3) is less than impedance Z(F4). Thus, frequency F3 is a better frequency than F4.

In further testing, the monitor 900 adjusts the frequency of the control signals 105 to be a frequency of F2. The monitor 130 detects that the impedance of the switched-capacitor converter 120 Z(F2) is greater than impedance Z(F3). Thus, frequency F3 is a better frequency than F2.

Via the frequency hunting in method 900, the monitor 130 selects frequency F3 as the resonance frequency in which to operate the switched-capacitor converter 120.

Figure 10:
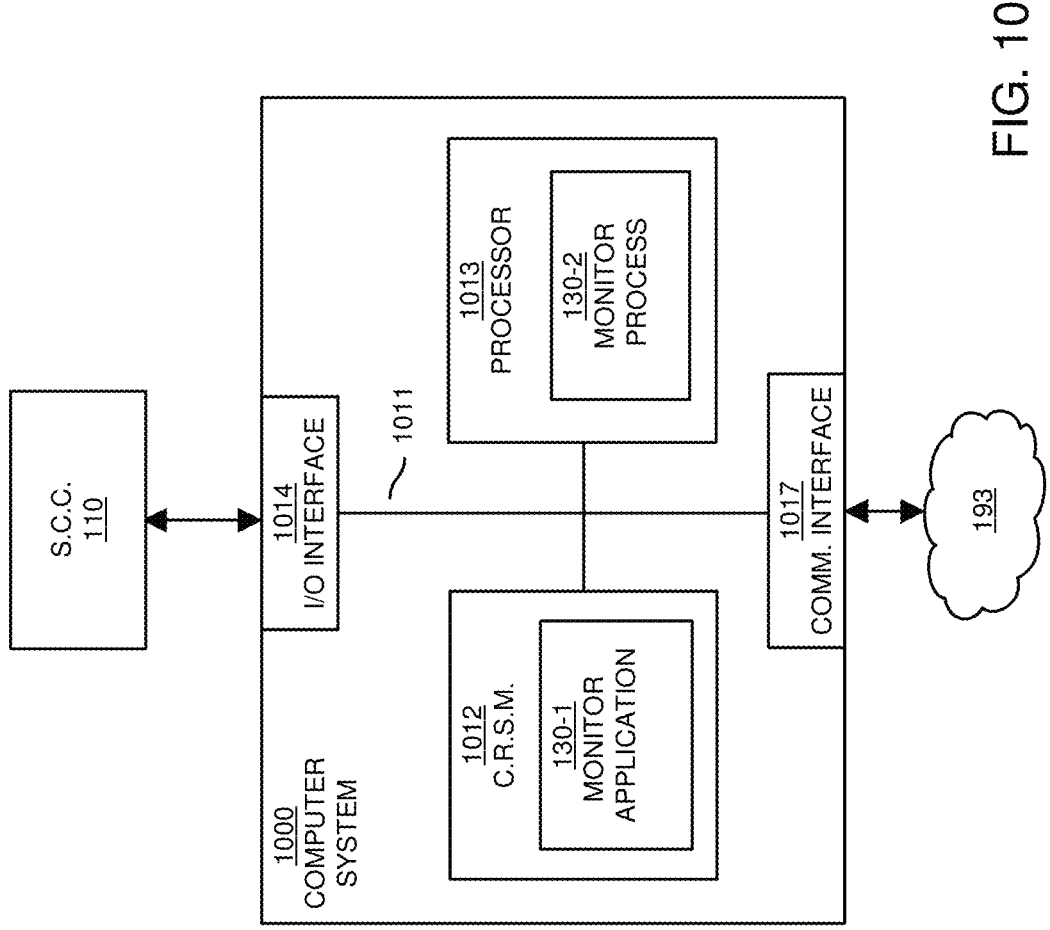
FIG. 10 is an example diagram illustrating example computer architecture operable to execute one or more operations according to embodiments herein.

FIG. 10 is an example block diagram of a computer system for implementing any of the operations as previously discussed according to embodiments herein.

Any of the resources (such as monitor 130, controller 110, switched-capacitor converter 120, etc.) as discussed herein can be configured to include computer processor hardware and/or corresponding executable instructions to carry out the different operations as discussed herein.

As shown, computer system 1050 of the present example includes an interconnect 1011 that couples computer readable storage media 1012 such as a non-transitory type of media (which can be any suitable type of hardware storage medium in which digital information can be stored and retrieved), a processor 1013 (computer processor hardware), I/O interface 1014, and a communications interface 1017.

I/O interface(s) 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with monitor application 130-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in monitor application 130-1 stored on computer readable storage medium 1012. Execution of the monitor application 130-1 produces monitor process 130-2 to carry out any of the operations and/or processes as discussed herein.

Those skilled in the art will understand that the computer system 1050 can include other processes and/or software and hardware components, such as an operating system that controls allocation and use of hardware resources to execute monitor application 130-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowchart in FIGS. 11 and 12. Note that the steps in the flowcharts below can be executed in any suitable order.

Figure 11:
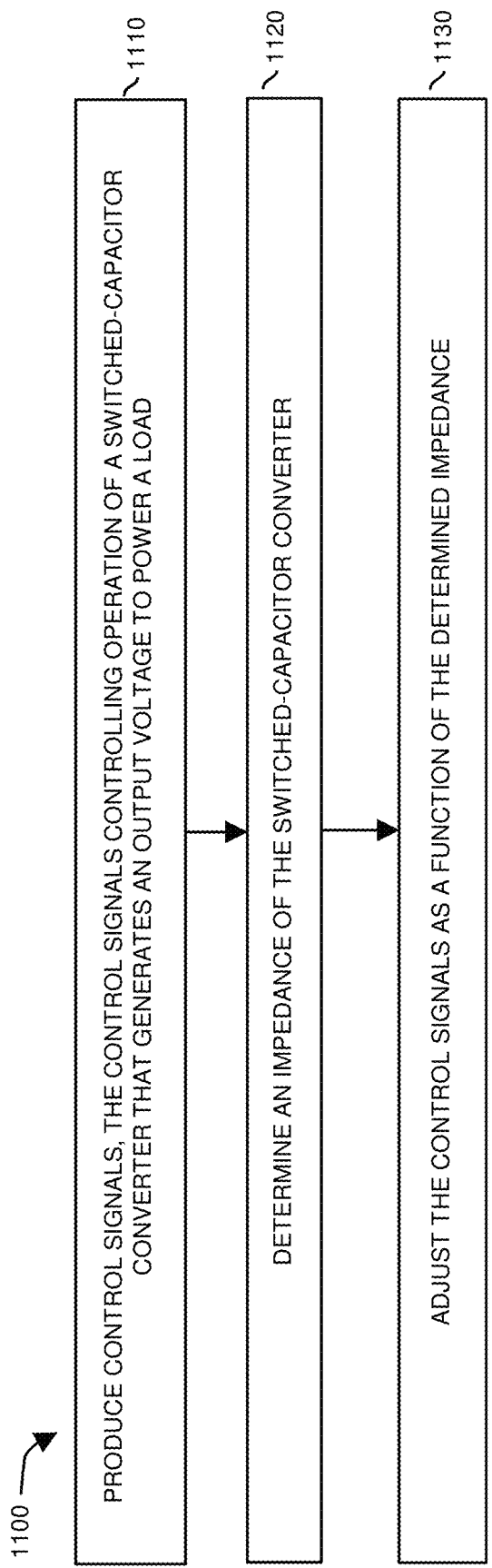
FIGS. 11-12 are example diagrams illustrating methods according to embodiments herein.

FIG. 11 is a flowchart 1100 illustrating an example method according to embodiments herein. Note that there will be some overlap with respect to concepts as discussed above.

In processing operation 1110, the controller 110 produces control signals 105. The control signals 105 control operation of a switched-capacitor converter 120 that generates an output voltage Vout to power a load 118.

In processing operation 1120, the monitor 130 determines an impedance of the switched-capacitor converter 120.

In processing operation 1130, the controller 110 adjusts the control signals as a function of the determined impedance.

Figure 12:
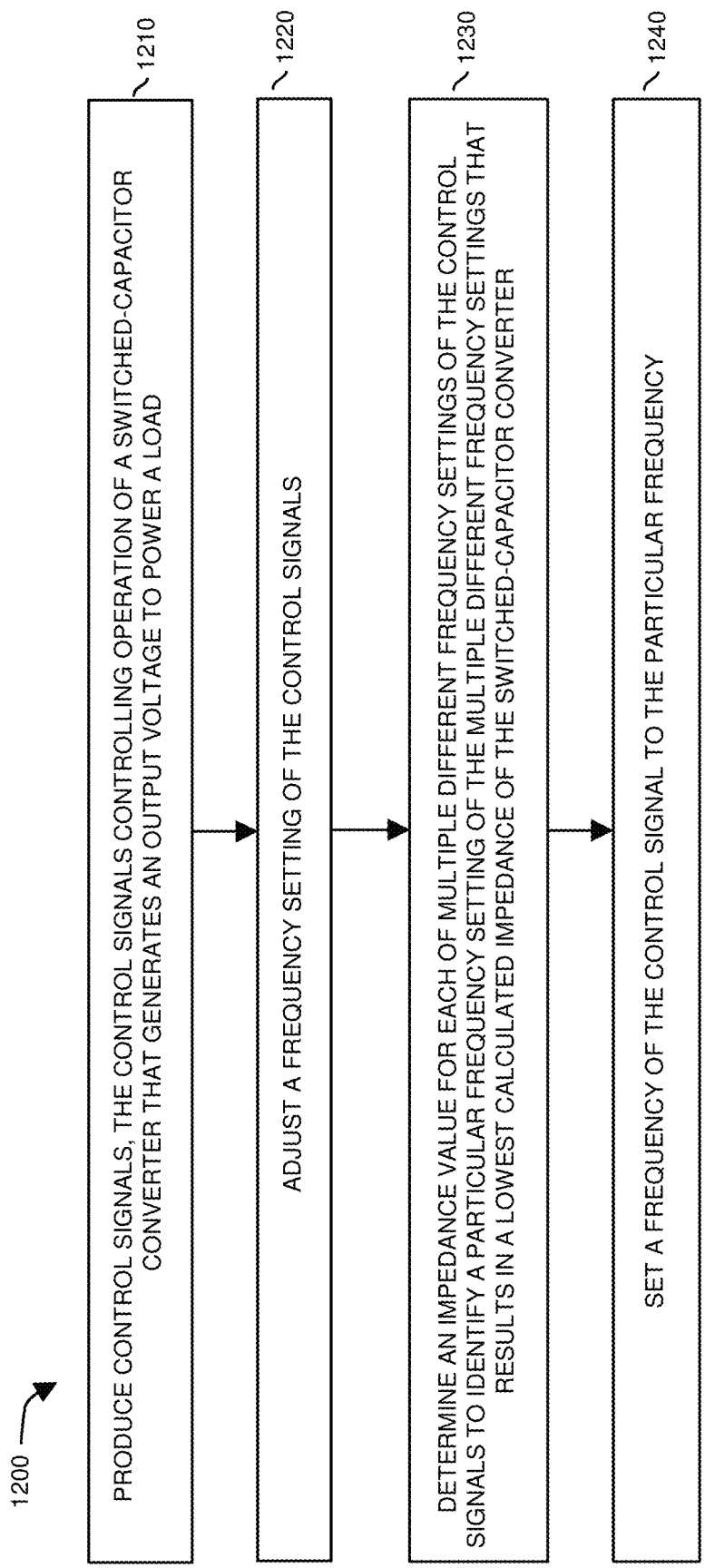

FIG. 12 is a flowchart 1200 illustrating an example method according to embodiments herein. Note that there will be some overlap with respect to concepts as discussed above.

In processing operation 1210, the controller 110 produces control signals 105. The control signals 105 control operation of a switched-capacitor converter 120 that generates an output voltage Vout to power a load 118.

In processing operation 1220, the controller 110 adjusts a frequency setting of the control signals 105.

In processing operation 1230, the monitor 130 determines an impedance value for each of multiple different frequency settings of the control signals 105 to identify a particular frequency setting of the multiple different frequency settings that results in a lowest determined impedance of the switched-capacitor converter 120.

In processing operation 1240, the monitor 130 sets a frequency of the control signals 105 to the particular frequency.

Note again that techniques herein are well suited for use in power supply applications. However, it should be noted that embodiments herein are not limited to use in such applications and that the techniques discussed herein are well suited for other applications as well.

Further Embodiments

As previously discussed, embodiments herein propose to adjust the frequency of the switched-capacitor converter 120 based on a prediction obtained from (the history) of input and output current and voltage values stored in buffers 731, 732, 733, and 734.

In one embodiment, the monitor 130 is or includes a predictor. The output of the predictor may be the pulse width modulation signal for the ZVS directly, or a value that is then transformed into the PWM signal, e.g. by using a programmable fractional frequency divider. Note that the approaches as described herein such as adjusting a frequency of the control signals can be transformed into one that adjusts pulse width modulation signals to achieve the same results.

The frequency predictor and prior filtering stages may facilitate machine learning methods (e.g. feed forward neural networks or recurrent neural networks), classical optimization methods (e.g. Newton-iteration based), statistical methods (e.g. genetic algorithms), reinforcement learning, or any combination thereof.

Technical Implementations

Note that the physical values for Vin, Iin, Vout and Tout can be measured periodically and the transformed by an ADC (Analog to Digital Converter) into digital values. These values can be stored in buffers 731, 732, 733, and 734. To this end, the current values (for Iin and Tout) can be stored as voltages representative of the amount of detected current. This transformation of current to voltage can be realized with a DCR current measuring disposed in the switched-capacitor converter 120, but could also be obtained by current sensing functionality of the power stage directly. In one embodiment, the "simultaneous" conversion (of all monitored parameters 107 is best realized with one ADC and four channels and each channel is equipped with a sample and hold circuit (S&H) such as sampler 730. The converted values are then stored in FIFO queues (such as buffers 731, 732, 733, and 734) with a length N.

As previously discussed, FIGS. 7 and 8 provide an overview of one possible embodiment of the input circuitry of the frequency predictor. The prediction of the system impedance forms the foundation of the prediction of the optimal switching frequency associated with the switched-capacitor converter 120.

Note that the data analyzer 750 (such as an impedance predictor) can include:
- An (optional) input filter that determine if the current behavior of the switched-capacitor converter 120 allows a reliable prediction of the impedance.
- An algorithm that predicts the impedance from the (possibly filtered) input buffers 731, 732, 733, and 734.

In accordance with further embodiments, the input filter (associated with the data analyzer 750) has two functions: It applies some smoothing to the input data (Vin. Iin, Vout, Iout) and it determines if the impedance predictor (impedance analyzer 760) can make a stable prediction based on this data. This might not be the case if the switched-capacitor converter 120 is not in steady-state operations but in a transient phase where it "recovers" from a load perturbation. These include a change in the input voltage, a change of the output current, or a change of the switching frequency.

During the transient phase, the switched-capacitor converter 120 might store or release energy in its circuitry which will lead to an incorrect computation of the impedance.

Further embodiments herein include machine-based learning approaches. As another preferred embodiment, embodiments herein include an implementation of the input filtering (implemented by the data analyzer 750) based on neural networks in order to classify the input as applicable for the computation of the impedance or not, and a regression computation for a filtered value.

In one embodiment, a classification network (such as implemented by the data analyzer 750) provides classification using logistic regression. This approach is widely used for all kinds of classification problems and it can be interpreted as neural network. More complex approaches, e.g. with hidden layers or even with recurrent neural networks. Especially long-short-term memory networks (LSTMS), allow the classification network to have an internal memory which can be used to reduce the amount of input measurements, i.e. lower the number n.

In one embodiment, in order to classify correctly, this network requires adequate training. Training is the determination of the values for the parameters of the implemented network. To this end, the user (or manufacturer of the device) needs to assemble representative examples of input curves that indicate a transient state or steady-state system. Then, the necessary parameters are transferred into the device and the device can perform the classification accordingly.

In one embodiment, the filtering networks provide some smoothing of the input data. One embodiment includes adaptive neural network filters, which may be based on feed-forward or recurrent neural networks. Standard filters, like a gliding mean filter can be represented by this approach easily. Using hidden layers with non-linear activation functions (such as implemented via artificial intelligence or any other suitable manner) allow achieving almost any form of filtering.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A system comprising:
    a switched-capacitor converter to generate an output voltage to power a load;
    a monitor operable to monitor operation of the switched-capacitor converter and determine an output impedance of the switched-capacitor converter based on the monitored operation; and
    a controller operable to: i) produce control signals, the control signals controlling switching operation of the switched-capacitor converter to generate the output voltage, and ii) adjust a frequency of the control signals as a function of the determined output impedance;
    wherein a first setting of the frequency of the adjusted control signals corresponds to a first output impedance of the switched-capacitor converter, the first output impedance being a minimum output impedance; and
    wherein a second frequency of the adjusted control signals corresponds to a second output impedance of the switched-capacitor converter, the second frequency being greater than the first frequency, the second output impedance being greater than the first output impedance.

2. The system as in claim 1, wherein the monitor is further operable to: i) monitor operational parameters of the switched-capacitor converter for multiple different frequency settings of the control signals, the operational parameters including a magnitude of the output voltage produced by the switched-capacitor converter, and ii) determine the output impedance of the switched-capacitor converter for each of the multiple different frequency settings of the control signals via settings of the monitored operational parameters.

3. The system as in claim 1, wherein the monitor is further operable to: determine the output impedance for each of multiple different frequency settings of the control signals to identify a particular frequency setting of the multiple different frequency settings that results in a lowest determined output impedance of the switched-capacitor converter.

4. The system as in claim 3, wherein the controller is further operative to:
select the particular frequency setting from the multiple different frequency settings; and
apply the particular frequency setting to the control signals.

5. The system as in claim 1, wherein the monitor is operative to determine a respective output impedance value for each of multiple different frequency settings of the control signals during uninterrupted powering of the load via the output voltage.

6. The system as in claim 1, wherein a setting of the frequency is a resonant frequency of the switched-capacitor converter; and
wherein the adjusted control signals operate the switched-capacitor converter at the resonant frequency of the switched-capacitor converter.

7. The system as in claim 1, wherein the monitor is further operable to:
monitor a magnitude of the output voltage (Vout);
monitor a magnitude of an output current (Iout) supplied by the output voltage to the load; and
measure the output impedance of the switched-capacitor converter based on the magnitude of the output voltage and the magnitude of the output current.

8. The system as in claim 7, wherein the output impedance of the switched-capacitor converter is calculated as:
output impedance=(Vout/Iout), where Vout represents a magnitude of the output voltage, and where Iout represents an amount of current supplied by the output voltage to the load.

9. The system as in claim 1, wherein the monitor is further operable to:
monitor an operational state of the switched-capacitor converter; and
in response to detecting that the switched-capacitor converter operates in transient state mode in which the load consumes different amounts of current, prevent activation of an adjustment circuit and adjustment of the control signals; and
in response to detecting that the switched-capacitor converter in response to detecting that the switched-capacitor converter operates in steady state mode in which the load consumes a same amount of current over time, activate the adjustment circuit that adjusts the control signals.

10. The system as in claim 1, wherein the switched-capacitor converter includes multiple resonant circuit paths, each of the multiple resonant circuit paths having a same resonant frequency, the multiple resonant circuit paths collectively operated to generate the output voltage to power the load.

11. The system as in claim 10, wherein the controller is further operable to apply the adjusted frequency of the control signals to operate the switched-capacitor converter at the resonant frequency of the multiple resonant circuit paths.

12. The system as in claim 1, wherein a third frequency of the adjusted control signals corresponds to a third output impedance of the switched-capacitor converter, the third frequency being less than the first frequency, the third output impedance being greater than the first output impedance.

13. The system as in claim 1, wherein the first setting of the frequency is a resonant frequency of a resonant circuit path in the switched-capacitor converter.

14. The system as in claim 1, wherein the switched-capacitor converter includes: i) a first resonant circuit path, ii) a second resonant circuit path, and iii) a flying capacitor; and
wherein the controller is further operable to: repeatedly switch between: i) connecting the first resonant circuit path and the flying capacitor in series and ii) connecting the second resonant circuit path and the flying capacitor in series.

15. The system as in claim 1,
wherein the controller is further operable to: i) measure the output impedance of the switched-capacitor converter for each of multiple different frequency settings of the control signals; and ii) select amongst the multiple different frequency settings in which to set the control signals of the switched-capacitor converter.

16. The system as in claim 1, wherein the controller is further operable to: based on adjustments to the frequency of the control signals and corresponding measurements of the output impedance of the switched-capacitor converter, identify a resonant frequency of the switched-capacitor converter, and set the control signals to the identified resonant frequency.

17. The system as in claim 1, wherein the monitor is further operable to determine the output impedance of the switched-capacitor converter based on a magnitude of the output voltage divided by a magnitude of current provided by the output voltage to power the load.

18. The system as in claim 1, wherein the controller is further operative to:
adjust the control signals based on a comparison of the first output impedance and the second output impedance.

19. The system as in claim 1, wherein the controller is further operative to:
test operation of the switched-capacitor converter at multiple different settings of the frequency; and
select a setting of the frequency of the control signals based on the test operation.

20. The system as in claim 19, wherein the selected setting of the frequency of the control signals is a resonant frequency of the switched-capacitor converter.

21. The system as in claim 1, wherein the controller is operative to control operation of the frequency at multiple different magnitudes to select a setting of the frequency of the control signals.

22. The system as in claim 1, wherein the controller is further operative to operate the controls signals at different frequency magnitudes to select a setting of the frequency of the control signals.

23. The system as in claim 1, wherein the output impedance of the switched-capacitor converter varies depending on a magnitude of the frequency of the control signals, a magnitude of the output impedance being a minimum magnitude of the output impedance at a valley corresponding to the first setting of the frequency.

24. The system as in claim 1, wherein the switched-capacitor converter includes a first circuit path and a second circuit path, the first circuit path being a resonant circuit path, the second circuit path including a series connection of a flying capacitor and a flying inductor, the system further comprising:
a switch disposed between the first circuit path and the second circuit path, activation of the switch to an ON state electrically connecting the first circuit path in series with the second circuit path, deactivation of the switch to an OFF state electrically disconnecting the first circuit path from being in series with the second circuit path.

25. The system as in claim 1, wherein the switched-capacitor converter includes:
a first circuit path, the first circuit path being a first resonant circuit path;
a second circuit path, the second circuit path being a second resonant circuit path;
a first series connection of a first flying capacitor and a first flying inductor and the first resonant circuit path; and
a second series connection of the first flying capacitor and the first flying inductor and the second resonant circuit path.

26. The system as in claim 1, wherein the switched-capacitor converter includes: i) a first resonant circuit path, ii) a second resonant circuit path, and iii) a flying capacitor circuit path including a flying capacitor and a flying inductor disposed in series; and
wherein the controller is further operable to: repeatedly switch between: i) connecting the first resonant circuit path and the flying capacitor circuit path in series, and ii) connecting the second resonant circuit path and the flying capacitor circuit path in series.

27. A system comprising:
a switched-capacitor converter to generate an output voltage to power a load;
a monitor operable to monitor operation of the switched-capacitor converter and determine an output impedance of the switched-capacitor converter based on the monitored operation; and
a controller operable to: i) produce control signals, the control signals controlling switching operation of the switched-capacitor converter to generate the output voltage, and ii) adjust a frequency of the control signals as a function of the determined output impedance;
wherein the monitor is further operable to: i) compare the determined output impedance to a threshold value; ii) in response to detecting that the determined output impedance is above the threshold value, determine the output impedance of the switched-capacitor converter for each of multiple different frequency settings of the control signals to identify a particular frequency setting of the multiple frequency settings that results in a lowest determined output impedance of the switched-capacitor converter; and
wherein the controller is further operable to: adjust the frequency of the control signals to the particular frequency setting.

28. A method comprising:
producing control signals, the control signals controlling operation of a switched-capacitor converter that generates an output voltage to power a load;
via a monitor, determining an output impedance of the switched-capacitor converter; and
adjusting a frequency of the control signals as a function of the determined output impedance;

the method further comprising:
comparing the determined output impedance to a threshold value;
in response to detecting that the determined output impedance is above the threshold value, calculating the output impedance of the switched-capacitor converter for each of multiple different frequency settings of the control signals to identify a particular frequency setting of the multiple different frequency settings that results in a lowest determined output impedance of the switched-capacitor converter; and
wherein adjusting the frequency of the control signals includes setting a frequency of the control signals to the particular frequency setting.

29. The method as in claim 28 further comprising:
monitoring operational parameters of the switched-capacitor converter for multiple different frequency settings of the control signals, the operational parameters including a magnitude of the output voltage produced by the switched-capacitor converter; and
wherein determining the output impedance includes: utilizing settings of the monitored operational parameters of the switched-capacitor converter for each of the multiple different frequency settings of the control signals to determine the output impedance.

30. The method as in claim 28, wherein a first setting of the adjusted control signals controlling operation of the switched-capacitor converter corresponds to a first output impedance of the switched-capacitor converter, the first output impedance being greater than a minimum output impedance amongst the multiple different frequency settings of the control signals; and
wherein a second setting of the adjusted control signals controlling operation of the switched-capacitor converter corresponds to a second output impedance, the second output impedance being a minimum detected output impedance amongst the multiple different frequency settings of the control signals.

31. The method as in claim 28 further comprising:
calculating an output impedance value for each of multiple different frequency settings of the control signals via uninterrupted powering of the load via the output voltage.

32. The method as in claim 28, wherein the adjusted frequency of the control signals operate the switched-capacitor converter at a resonant frequency of the switched-capacitor converter.

33. The method as in claim 28 further comprising:
monitoring a magnitude of the output voltage (Vout);
monitoring a magnitude of an output current (Iout) supplied by the output voltage to the load;
calculating the output impedance of the switched-capacitor converter based on the magnitude of the magnitude of the output voltage, and the magnitude of the output current.

34. The method as in claim 33, wherein the output impedance of the switched-capacitor converter is determined as:
output impedance=(Vout/Iout); where Vout represents a magnitude of the output voltage, and where Iout represents an amount of current supplied by the output voltage to the load.

35. The method as in claim 28, wherein the determining and the adjusting includes:
setting the control signals of the switched-capacitor converter to a first frequency;

while the switched-capacitor converter is operated at the first frequency, determining a first output impedance of the switched-capacitor converter;
setting the control signals of the switched-capacitor converter to a second frequency;
while the switched-capacitor converter is operated at the second frequency, determining a second output impedance of the switched-capacitor converter; and
comparing the second output impedance to the first output impedance.

36. The method as in claim 35 further comprising:
via the comparing, detecting that the second output impedance is lower than the first output impedance; and
in response to detecting that the second output impedance is lower than the first output impedance, setting the control signals of the switched-capacitor converter to the second frequency.

37. The method as in claim 35 further comprising:
via the comparing, detecting that the second output impedance is greater than the first output impedance; and
in response to detecting that the second output impedance is greater than the first output impedance, setting the control signals of the switched-capacitor converter to the first frequency.

38. A system comprising:
a switched-capacitor converter to generate an output voltage to power a load;
a monitor operable to monitor operation of the switched-capacitor converter and determine an output impedance of the switched-capacitor converter based on the monitored operation; and
a controller operable to: i) produce control signals, the control signals controlling switching operation of the switched-capacitor converter to generate the output voltage, and ii) adjust a frequency of the control signals as a function of the determined output impedance;
wherein the output impedance of the switched-capacitor converter varies depending on a magnitude of the frequency of the control signals, a magnitude of the output impedance being a minimum magnitude of the output impedance at a valley corresponding to a first setting of the frequency;
wherein an increase in a magnitude of the frequency with respect to the first setting of the frequency increases a magnitude of the output impedance with respect to the minimum magnitude of the output impedance; and
wherein a decrease in the frequency with respect to the first setting of the frequency increases a magnitude of the output impedance with respect to the minimum magnitude of the output impedance.

39. A system comprising:
a switched-capacitor converter to generate an output voltage to power a load;
a monitor operable to monitor operation of the switched-capacitor converter and determine an output impedance of the switched-capacitor converter based on the monitored operation; and
a controller operable to: i) produce control signals, the control signals controlling switching operation of the switched-capacitor converter to generate the output voltage, and ii) adjust a frequency of the control signals as a function of the determined output impedance;
wherein a first setting of the frequency of the adjusted control signals corresponds to a first output impedance of the switched-capacitor converter;
wherein an increase in the frequency with respect to the first setting increases a magnitude of the output impedance of the switched-capacitor converter with respect to the first output impedance; and
wherein a decrease in the frequency with respect to the first setting increases a magnitude of the output impedance of the switched-capacitor converter with respect to the first output impedance.

40. A system comprising:
a switched-capacitor converter to generate an output voltage to power a load;
a monitor operable to monitor operation of the switched-capacitor converter and determine an output impedance of the switched-capacitor converter based on the monitored operation;
a controller operable to: i) produce control signals, the control signals controlling switching operation of the switched-capacitor converter to generate the output voltage, and ii) adjust a frequency of the control signals as a function of the determined output impedance;
wherein the monitor is further operable to: i) compare the determined output impedance to a threshold value; ii) in response to detecting that the determined output impedance is above the threshold value, determine the output impedance of the switched-capacitor converter for each of multiple different frequency settings of the control signals to identify a particular frequency setting of the multiple different frequency settings that results in a lowest determined output impedance of the switched-capacitor converter; and
wherein the controller is further operable to: adjust the frequency of the control signals to the particular frequency setting.

41. A system comprising:
a switched-capacitor converter to generate an output voltage to power a load;
a monitor operable to monitor operation of the switched-capacitor converter and determine an output impedance of the switched-capacitor converter based on the monitored operation;
a controller operable to: i) produce control signals, the control signals controlling switching operation of the switched-capacitor converter to generate the output voltage, and ii) adjust a frequency of the control signals as a function of the determined output impedance;
wherein the determined output impedance is a first determined output impedance associated with a first setting of the frequency; and
wherein a second frequency of the adjusted control signals corresponds to a second output impedance of the switched-capacitor converter, the second frequency being greater than the first frequency, the second output impedance being greater than the first output impedance.

* * * * *

UNITED STATES PATENT AND TRADEMARK OFFICE
CERTIFICATE OF CORRECTION

| | |
|---|---|
| PATENT NO. | : 11,811,316 B2 |
| APPLICATION NO. | : 16/228444 |
| DATED | : November 7, 2023 |
| INVENTOR(S) | : Benjamin L. Schwabe, Christian Rainer and Darryl Galipeau |

It is certified that error appears in the above-identified patent and that said Letters Patent is hereby corrected as shown below:

In the Claims

Column 19 Line 53 Claim 9, delete "in response to detecting that the switched-ca-"
Column 19 Line 54 Claim 9, delete "pacitor converter"

Signed and Sealed this
Twenty-sixth Day of March, 2024

*Katherine Kelly Vidal*

Katherine Kelly Vidal
*Director of the United States Patent and Trademark Office*